Jan. 24, 1933.  G. A. MACREADY  1,895,000
ORIENTATION CORE DRILL
Filed Feb. 24, 1930    4 Sheets-Sheet 1
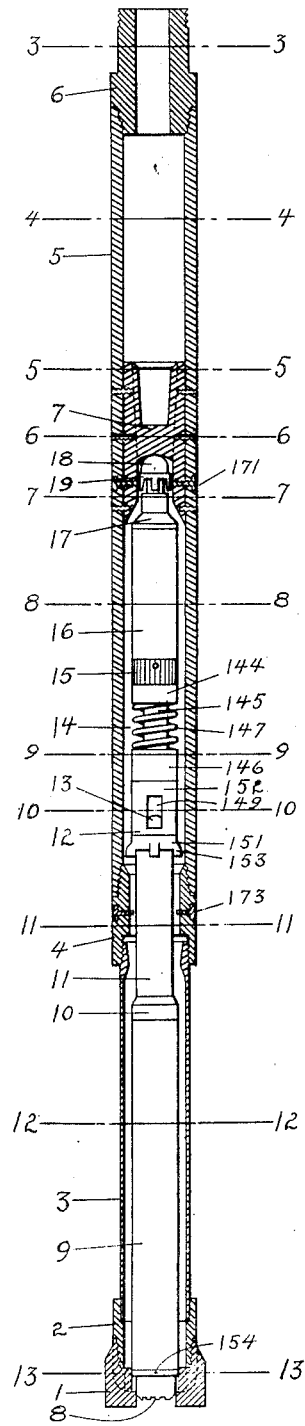
Fig. 1
Fig. 2
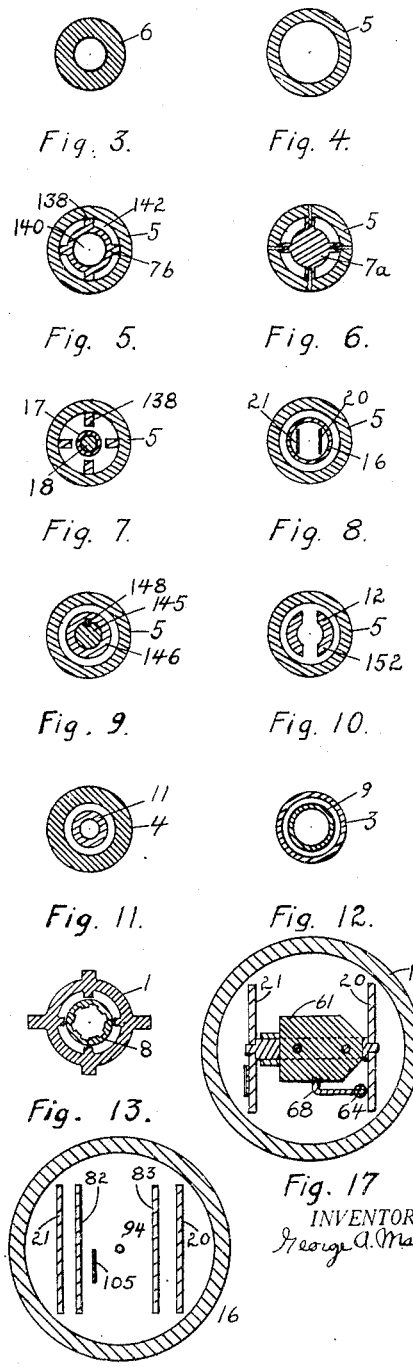
Fig. 3.  Fig. 4.
Fig. 5.  Fig. 6.
Fig. 7.  Fig. 8.
Fig. 9.  Fig. 10.
Fig. 11.  Fig. 12.
Fig. 13.
Fig. 17
Fig. 18.
INVENTOR.
George A. Macready INVENTOR.
George A. Macready Jan. 24, 1933. G. A. MACREADY 1,895,000
ORIENTATION CORE DRILL
Filed Feb. 24, 1930 4 Sheets-Sheet 3

INVENTOR.
George A. Macready

Jan. 24, 1933.   G. A. MACREADY   1,895,000
ORIENTATION CORE DRILL
Filed Feb. 24, 1930   4 Sheets-Sheet 4

INVENTOR.
George A. Macready

Patented Jan. 24, 1933

1,895,000

UNITED STATES PATENT OFFICE

GEORGE A. MACREADY, OF LOS ANGELES, CALIFORNIA

ORIENTATION CORE DRILL

Application filed February 24, 1930. Serial No. 430,908.

My invention relates to improvements in core drilling in which the original underground position or orientation of a core is recorded.

In underground drilling core samples are taken to determine the character of the formation, but very few core drills have been designed to determine the original position of the core before it is broken from the matrix. In petroleum districts the direction of the dip or inclination of strata in wells is valuable information relative to determining the location of an anticlinal axis. When a core showing stratification planes is oriented the true direction of formation dip in the well can be determined. In many cases this information is not available from surface geology because of absence of geological exposures or because the deeper formation is not conformable with the formation outcropping at the well.

I disclosed apparatus for orienting cores in my co-pending applications: Serial Number 107,980 filed May 10, 1926, and Serial Number 271,932 filed April 21, 1928. In many types of formation the apparatus disclosed in these two applications gives excellent results. The first form has been the most used in deep wells and has oriented cores to more than 4500 feet in depth which is very much deeper than any orientation ever made with any other core drills but the splined tripping mechanism at the upper end is expensive to construct, operate and repair. The second form is not so adaptable to deep tests because of the difficulty in estimating the exact predeterminable instant that the core can be completed with the result that the drill pipe must be rotated without digging for a considerable period to prevent becoming stuck and this rotation at one depth tends to break or wash the core away so that the core twists and spoils the orientation. It has been found best to record the orientation of the core immediately after the core has been completed. The second form is much simpler and less expensive to construct.

The principal object of the present invention has been to overcome the above difficulty of "synchronizing" the instant of recording with the instant of completion of the core. This is accomplished by providing an instrument which makes a record of the direction and inclination relative to the core barrel at frequent, regular, accurately timed intervals. In this way coring can be completed at any time and the record made within a very few minutes afterward so that no long period of waiting is necessary. Observation of time on the observers watch, which should previously have been compared to the instrument, indicates the proper record to select.

Another object of my invention is an apparatus which can make a record of the magnitude and direction of the deviation of a well hole from vertical at frequent intervals so that a complete survey of the hole can be obtained.

Another object of my invention is an attachment to the recording instrument by which the interval elapsing between observations can be easily and quickly varied.

Another object of my invention is a photographic instrument which can record the shadow of a compass and pendulum on a continuous photographic strip by advancing the strip between each exposure.

Another object of my invention is a novel form of releasing mechanism for moving the record strip.

Another object of my invention is a novel form of photo-compass-pendulum in which a magnetic compass needle is carried on a pivot within the pendulum and casts a characteristic shadow on a photographic sheet.

An object of my invention is a core drill having a floating inner barrel which can be easily assembled and in which provision is made to prevent the inner barrel falling out in case of breakage of the upper end parts.

An object of my invention is a novel form of thrust bearing for core drills in which the circulation fluid is conducted past the bearing element close enough to cool it and yet avoid depositing débris in the bearing, and which has few parts liable to excessive wear or breakage.

An object of my invention is a trap to prevent large chips carried by the circulation fluid from wedging between the outer and inner core barrels, this trap being just above the thrust bearing.

Another object of my invention is a novel form of mud guard or plug to prevent large chunks or débris entering and choking the inner core receiving tube.

With the foregoing and other objects in view which will be made manifest in the following detailed description and especially pointed out in the appended claims, reference is had to the accompanying drawings for illustrative embodiment of my invention, wherein:—

Figure 1 shows the assembly of my invention with the outer or rotatable organization in longitudinal section and the inner or longitudinally moving organization in elevation or view:

Figure 2 is an external view of my invention as assembled:

Figure 3 is a cross section taken on line 3—3, Figure 1:

Figure 4 is a cross section taken on line 4—4, Figure 1:

Figure 5 is a cross section taken on line 5—5, Figure 1:

Figure 6 is a cross section taken on line 6—6, Figure 1:

Figure 7 is a cross section taken on line 7—7, Figure 1:

Figure 8 is a cross section taken on line 8—8, Figure 1:

Figure 9 is a cross section taken on line 9—9, Figure 1:

Figure 10 is a cross section taken on line 10—10, Figure 1:

Figure 11 is a cross section taken on line 11—11, Figure 1:

Figure 12 is a cross section taken on line 12—12, Figure 1:

Figure 13 is a cross section taken on line 13—13, Figure 1:

Figure 17 is a cross section taken on line 17—17, Figure 14b:

Figure 18 is a cross section taken on line 18—18, Figure 14a:

Figure 27: and,

Similar numerals refer to similar parts throughout the several views.

Figures 14A, 14B, 14C:
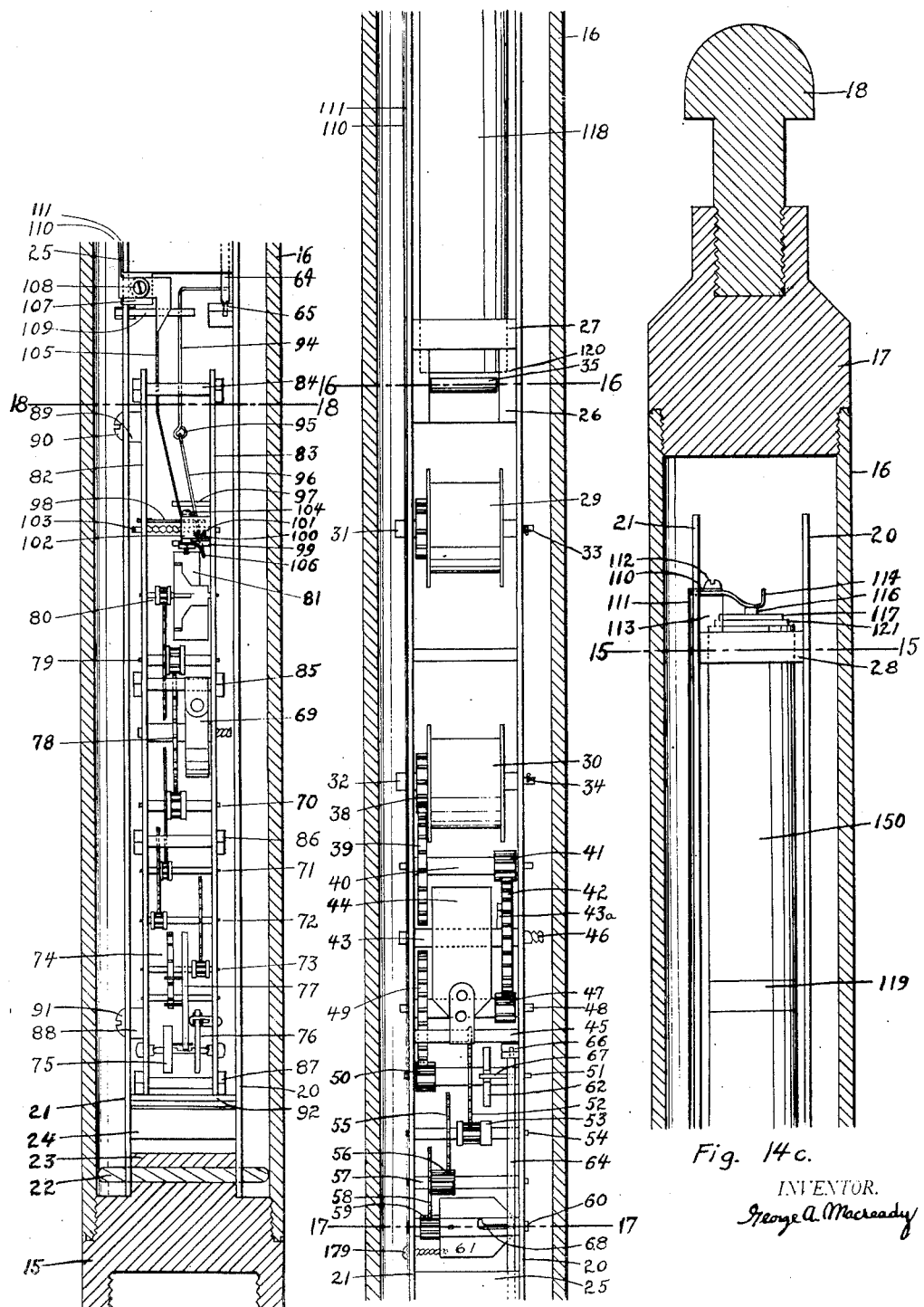
Figure 14 shows a larger scale detailed view of the construction of the recording instrument within the enclosing case which is shown in section, the three portions of Figure 14 designated as 14a, 14b, and 14c being lower, middle and upper portions respectively.

In the accompanying drawings the outer organization of my invention consists of a rotary core cutting shoe 1, a lower sub 2, an outer barrel 3 which may be of steel pipe, a coupling member 4, an outer case 5 preferably of bronze or other non-magnetic alloy, an upper sub 6 for attachment to a string of rotary drill pipe, and a thrust plug 7 attached within the outer case 5 by set screws or other means.

The inner organization consists of the inner core shaving shoe or nose 8, a core receiving barrel or tube 9, a coupling 10, a tube 11 of reduced diameter which may be dispensed with in many cases, a check valve member 12 provided with a ball 13, a spring coupling 14 which may be dispensed with in some formations, a graduated plug 15 closing the lower end of the case 16 which contains the recording instrument, a top closure 17 for the instrument case, a thrust bearing bolt 18, and a thimble 19 although numerous other types of thrust bearing can be used.

The form of recording instrument is shown on Figure 14 consisting of three principal units: the timing unit shown in Figure 14a: the photographic record strip operating unit shown in the lower part of Figure 14b: and the compass and flashlight tubes shown in the upper part of Figure 14b and Figure 14c.

Briefly explained the operation is as follows. The apparatus is a rotary tool and is lowered into a well on rotary drill pipe. The outer organization is rotated causing cutter head 1 to dig around a core. Weight imposed through the thrust bearing 18 forces the inner barrel 3 longitudinally over a core. Photographs of a compass and pendulum are taken at regular accurately timed intervals (say 8 minutes apart). The exact time of each photo is known relative to an observer's watch and the exact position of each is known relative to plug 15 and core barrel 3. Coring is completed immediately before an expected photograph is made. The core drill is withdrawn from the well after the photo is made and the photographic record developed. The photograph corresponding to the completion of coring is selected and its relation to the core determined through graduated plug 15 and inner barrel 3. Since the photograph shows the position of the compass or magnetic north the direction faced by any side of the core can be determined: in other words the core is oriented. Once oriented, if stratification planes are visible on the core it is a simple matter to deduce the direction of stratigraphic dip in the bottom of the well.

The units making up the recording instrument are carried on a frame such as the long parallel plates or strips 20, 21 which in turn are supported on the graduated reference plug 15 and held in place by a pin 22 which may fit in holes eccentric to the projection 23 of plug 15 so that the frame can only be attached in one position relative to the zero mark of the graduations on plug 15. The frame is stiffened by bridges 24, 25, 26, 27, 28 which are rigidly attached as by screws to plates 20, 21. The instrument assembly is enclosed inside the case 16 which may be provided with recessed gaskets at the end joints to withstand the high pressures prevailing in deep wells.

Figure 19:
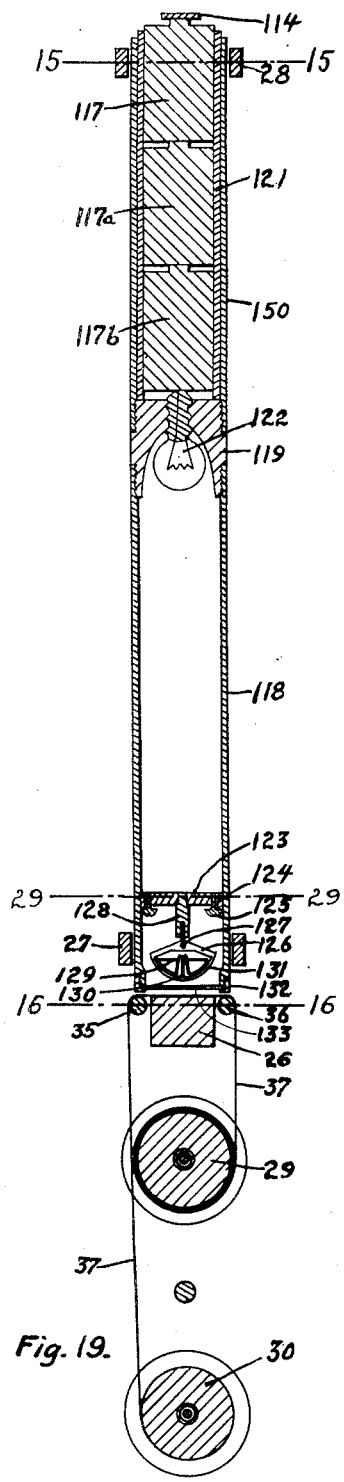
Figure 19 is a longitudinal section on the same scale as Figure 14 of the upper portion of the instrument through the flashlight tube and reels showing the construction of the compass and pendulum and the path of the photographic strip.

The record strip unit consists of a tail reel 29 on which the fresh photographic strip 37 (strip shown in Figure 19 but not in Figure 14) is spooled, and the lead reel 30 onto which the strip 37 is reeled during operation of the instrument. Each of these reels may be mounted on removable pins 31, 32 locked in place by ordinary household pins 33, 34 so that the reels are free to revolve and so that they can be removed easily. The bridge 26 above the reels is provided with rollers 35, 36 over which the photographic strip 37 is drawn from tail reel 29 by lead reel 30. The lead reel 30 is provided with a spur gear 38 meshing with a spur gear 39 on shaft 40. The pinion 41 is rigidly mounted on shaft 40 and is driven by spur gear 42, mounted on mainspring shaft 43, and provided with the conventional pall 43a for winding the spring. Shaft 43 may be threaded or squared at one end 46 for a winding key. The main spring 44 is mounted on shaft 43 and the outer end attached to the frame by cross brace 45. From the above description it will be seen that when the main spring 44 is wound it furnishes power to drive reel 30 which in turn advances photographic strip 37.

Figure 21:
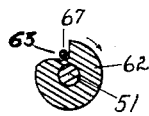
Figure 21 is a cross section through wheel 62.

The governing mechanism necessary to properly space the photographic exposures is as follows. A gear system from spur gear 42 by pinion 47, shaft 48, gear 49, pinion 50, shaft 51, gear 52, pinion 53, shaft 54, gear 55, pinion 56, shaft 57, gear 58, pinion 59 to shaft 60 drives the fan plate 61. One of the shafts, say shaft 51, has mounted thereon a smooth rimmed disc or wheel 62 on which is provided a deep notch 63 (Fig. 21) having the advance side radial and the rear side sloping to form a cam surface. The gear ratio is proportioned so that one revolution of this disc is made when the photographic strip 37 has advanced the proper distance for one observation. Each of the shafts 40, 43, 48, 51, 57 and 60 is journaled in holes in the frame plates 20, 21.

A shaft 64 is journaled as in blocks 65, 66 mounted on frame plate 20 so that the axis of the shaft is parallel to the frame. An arm 67 projects from shaft 64 in a position so that it can co-operate with notch 63 of wheel 62 for a purpose hereinafter described. Another arm 68 having a hocked end also projects from shaft 64 so that it can engage fan 61 to lock the gear mechanism. Shaft 64 passes through a hole in bridge 25.

The timing unit is important because several hours elapse from the time the core drill is assembled until the time of the desired record. Records are made at frequent intervals, one to eight minutes apart, and it is necessary to regulate the timing mechanism so that any observation can be identified by comparison with the observers watch which should be an accurate one. This requirement calls for an accuracy of less than one minute error in several hours. The timing mechanism is as follows.

The timing mechanism is driven by a main spring 69 and includes a gear system 70, 71, 72, 73 to an escapement wheel 74. A balance wheel 75 oscillated by the hair spring 76 rocks the escapement lever 77 to regulate the speed of the escapement wheel 74 which in turn regulates the speed of the entire mechanism. The mechanism just described from mainspring 69 to balance wheel 75 can be identical with common well known makes of clocks except for the fact that the wheels are arranged in a straight line instead of in a circular system. It should be constructed with the usual care and have the auxiliaries common to clock movements.

A second gear system takes off from main gear 78 in the opposite direction through gearing 79 to pinion 80. Mounted on the same shaft as pinion 80 is a star or spoked wheel 81 for a purpose hereinafter described. Gear ratios can be selected as desired but a very common ratio for most American clocks is such that members 70 and 79 make one revolution per hour, being used to carry the minute hand in clocks, and members 71 and 80 make one revolution in eight minutes. The timing mechanism just described is such that the star wheel 81 can be accurately regulated to make one revolution every eight minutes (if that is the ratio selected) so that it will be within a few seconds of its correct time after operating several hours.

Figure 22:
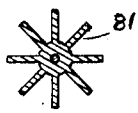
Figure 22 is a cross section through wheel 81.
Figure 15:
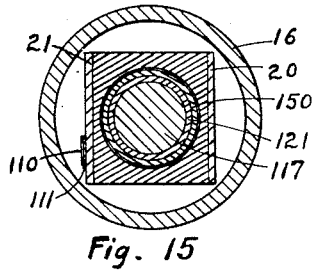
Figure 15 is a cross section taken on line 15—15, Figure 14c.
Figure 16:
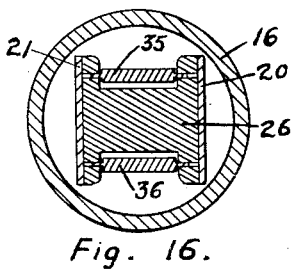
Figure 16 is a cross section taken on line 16—16, Figure 14b.

The star wheel 81 is divided into segments having different numbers of spokes or arms. The form shown in Figures 14a and 22 is an eight minute wheel having an eight spoke segment at the left for a one minute interval, a single spoke segment at the right for an eight minute interval, and two and four spoke segments between. Figure 22 is a cross section of the wheel through the eight spoke segment.

The timing mechanism with its star wheel 81 is mounted on a frame which can be made up of plates 82, 83 held together by spacer bars and nuts 84, 85, 86, 87. Screws 90, 91 are passed through longitudinal slots in the plate 21 of the main frame and screwed into the blocks 88, 89 which are rigidly attached to one side 82 of the smaller frame of the timing mechanism. When these screws are loosened the timing mechanism can be slid bodily a fraction of an inch longitudinally for adjustment, but when tightened the timing mechanism is clamped in place. When the timing mechanism has been clamped in place shims 92 can be inserted into the space between its frame and bridge 24 so that accidental shifting will not occur during drilling vibrations. The timing mechanism can be removed bodily in its small frame from the main frame for inspection and adjustment by removing the screws 90, 91. (Provided the space occupied by shims 92 is made large enough.)

A wire arm 94 projects from longitudinal shaft 64 and is bent to parallel the main frame ending in an eye 95. A short wire 96 is connected to said eye in such a manner as to permit free movement and this wire extends toward the timing mechanism so that the end contacts the spokes of the star wheel 81. As viewed on Figure 14a the wire 96 passes in front of a fulcrum pin 97, in front of a cantilever hair spring 98, and behind a stop pin 99: also between two pins 100 and 101 projecting from the block 102 which is composed of insulation material such as bakelite. The block 102 is supported on a threaded shaft 103 provided with a screw driver slot or wrench square at one end so that by twisting the shaft the block 102 can be shifted laterally. A screw 104 passes through the block 102 and acts as a retainer and electric conductor to attach the "bus bar" 105 and electric contact brush 106 to the block and in electric contact with each other. The contact tip of the brush 106 is positioned to be in alignment with the tip end of wire 96 so that both tips contact the same segment of spokes on star wheel 81. The "bus bar" 105 is of thin flexible electric conducting material cut and bent into such shape as to avoid touching metal parts of the mechanism and is attached to a block 107 by screw 108. Block 107 is of insulating material such as fiber or bakelite and is attached to one of the main frame plates 21.

The star wheel 81 is divided into segments having different numbers of spokes for the following purpose. In the position shown in Figure 14a the block 102 is at the extreme right so that the tip of brush 106 and wire 96 is in the path of the single spoke segment and contacts occur once every eight minutes. By screwing shaft 103 with a screw driver the block 102 can be shifted to the left to bring the contacts into the path of other segments, such as the eight spoke segment at the extreme right to cause one minute interval of operation. The brush 106 is rigidly attached to block 102 and the wire 96 is between the pins 100 and 101 attached to the block so that both these members are moved when the block moves. If shifting changes the distance between wheel 81 and wire 96 this change can be adjusted by loosening clamp screws 90, 91 and reclamping the frames in proper distance relation. It will be seen from this paragraph that the selection of a 1, 2, 4, or 8 minute interval (or whatever intervals are furnished by the star wheel) can be made within a few seconds by a very simple adjustment.

As previously stated "bus bar" 105 is insulated from the frame. Also connected to screw 108 is a strip 110 of copper or other conductor insulated from the frame by a sheet of insulation fiber 111 and and extending to the top of the main frame where it is held by a screw 112 threaded into another block of insulation 113. A conductor switch 114 is pivotally clamped against conductor 110 by screw 112 so that it can be swung clear of the electric dry cell 117 or swung onto the top 116 of the cell to make an electric contact.

The flashlight, compass and pendulum are contained in tubes 150 and 118 which are connected by coupling 119 forming a unit which can be lifted bodily out of the frame when switch 114 is swung aside. When in position in the frame this unit is supported on a shoulder 120 of bridge 26 and stands in holes through bridges 27 and 28. It will be noted that the position of shoulder 120 is such that a small space or crack about one-sixteenth inch thick is left between the floor of the bridge and the end of the tubular unit; it is through this crack that the photographic strip travels.

Inside the upper tube 150 may be a liner 121 of insulating fiber surrounding a series of electric dry cells 117, 117a, 117b which rest on the contact end of an electric light globe 122 screwed or otherwise attached in coupling 119.

Figure 29:
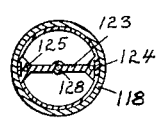
Figure 29 is a cross section through the bridge spider 123 taken on line 29—29, Figure 19.
Figure 26:
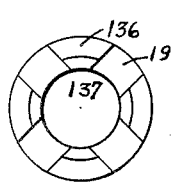
Figure 26 is a bottom view of thimble 19.

In the lower portion of lower tube 118 is a spider or bridge 123, shown in section in Figure 29, which may be held in place by slips 124 tightened by screws 125. Several forms of compasses and pendulums may be used. In the form illustrated the pendulum is a loop 126 suspended from eyelets 127 to swing freely from the lower end of rod 128 which is screwed into the center of spider 123 so that the rod 128 is on the central axis of the tube. The direction indicator is a magnetic compass needle 129 pivoted to swing freely on staff 130 which in turn is supported on loop 126 in such a position that the axis of the staff, center of gravity of loop 126 and pivot eyelets 127 are in a single line. Needle 129 may optionally be provided with an opaque indicator card or sheet 131 attached below the needle and of such shape as to cast an indicative shadow such as shadow 174 on Figure 23. The lower end of tube 118 may be threaded for a ferrule 132 which retains a sheet of transparent material such as glass or celluloid 133. One purpose of sheet 133 is to form a liquid tight closure for the tube so that liquid can be contained therein to serve as a damper to lessen swinging of the magnetic needle. Another purpose of sheet 133 is to support the staff for other forms of compass-pendulums which may be used instead of the form shown. Although a liquid damper may be used it has so many objectionable features that it is usually preferable to have tube 118 contain only air. Sheet 133 may also be dispensed with in many cases. It may be mentioned that the position of the compass loop should be as close as possible to the lower end of tube 118 but should not be so close that there is any danger of it touching sheet 133 or photographic strip 37. It may also be mentioned that the axis of tube 118 should be parallel to the axis of the core drill when assembled.

The operation of the recording instrument is as follows. The star wheel 81 revolves at an accurately uniform speed regulated by the timing mechanism. Each spoke comes in contact with the brush 106 which drags across the outer edge of the spoke closing the electric circuit so that current can flow in the circuit formed by the frame work, wheel 81, brush 106, screw 104, "bus bar" 105, conductor 110, switch 114, electric cells 117, 117a, 117b, lamp 122 which is grounded to the frame work. This current flashes the lamp 122 for a period of a few seconds to a minute depending on the spring of brush 106 and the width of the edge of the spoke. I find a flash of 15 to 30 seconds best. The rays from light 122 pass through tube 118 and cause a shadow of compass card 131 to be cast on the photographic sheet 37. As previously mentioned the needle 129 is pivoted to take a north south direction (magnetic) and is suspended as a pendulum. The card 131 should be of such shape that the center of gravity and the north end can be distinguished on the developed photo.

The circular end of tube 118 or ferrule 132 shields the photographic sheet 37 from rays outside the circle. When the photographic strip 37 is developed the area lighted by lamp 122 appears as the black circle 175 (Fig. 23) on which is the white shadow 174 of the compass-pendulum. The cross bar of bridge 123 is spaced a distance from the photographic strip so that its shadow is either an indistinct blur or invisible because of diffusion of light rays after passing the bar. The lamp 122 becomes dark when contact brush 106 slips off the rear side of the spoke.

Figure 20:
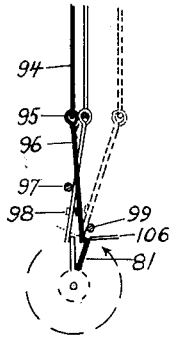
Figure 20 is a diagram illustrating the movement of the contact wheel and the tripping wires, successive positions being indicated by solid, full outline and dotted, the view point being 90 degrees from that of Figure 14.

Continuing its revolution the spoke of wheel 81 comes in contact with the end of wire 96 in the position shown in solid line in Figure 20. Further advance of wheel 81 urges the tip of wire 96 ahead of the spoke and because of fulcrum pin 97 the eye 95 is moved in the opposite direction until it assumes the position shown in full outline on Figure 20. During this movement arm 94 is moved by eye 95 to rotate longitudinal shaft 64 a fraction of a turn and in doing this the hook 68 is moved out of engagement with fan 61 (Fig. 17).

Release of fan 61 allows the mechanism turning reel 30 to start motion advancing the photographic strip 37, and also revolving disc 62. The arm 67 is adjusted so that it is not lifted completely out of notch 63 of disc 62 when the mechanism starts motion but as disc 62 revolves the cam surface engages arm 67 raising it to the rim of the disc on which it slides as the disc revolves. The arm 67 is raised quickly to the rim and in so doing imparts to shaft 64 an additional fractional rotation with the result that eye 95 is moved by arm 94 to the position shown in dotted outline on Figure 20. It will be observed that this movement is in a direction almost at right angles to the original positions of wire 96 and greater than the first movement caused directly by wheel 81. As seen on Figure 20 the tip of wire 96 is dragged off of the spoke of wheel 81. Spring 98 then comes into action and urges wire 96 against stop pin 99 and behind the spoke. It may be mentioned here that the position of wheel 81 should be adjusted by screws 90, 91 so that it is the proper distance from eye 95 to permit the tip of wire 96 to be engaged and also slip off the spokes at the proper instant.

The mechanism continues moving, advancing the photographic strip 37 and revolving disc 62 with arm 67 sliding on the rim, until the disc has made one complete revolution. One complete revolution should occur when the photographic strip has advanced the proper distance for one photograph, the gear ratio being proportional to accomplish this. The arm 67 drops into the notch 63 as soon as the steep side of the notch passes the arm. It will be noted that the cantilever spring 109 provides an urge to force the arm into the notch. At the same instant hook 68 again engages fan 61 to stop the strip moving mechanism and the wires 94 and 96 resume the original position shown in solid line on Figure 20 so that the instrument is ready for the next spoke of wheel 81. The advance of the photographic strip for each photograph can be made within five seconds ordinarily. The position of brush 106 should be such that the contact is broken a few seconds before the release of fan 61 so that the photographic strip is advanced while lamp 122 is dark. When observations are made one minute apart greater care must be taken in construction and adjustment than for a longer interval.

A simple and novel form of thrust bearing for core drills is disclosed. A round head bolt 18 is screwed into the upper end of the inner core barrel organization above the instrument case. A thimble 19 is loosely retained between the shoulders 134 of the bolt head and 135 of the instrument case top. Thimble 19 is in the form of a ring provided with several downwardly extending legs or prongs 136 and with a central bore 137. The bore 137 should be slightly larger than the diameter of the bolt 18 so that the bolt is journaled loosely in the bore. The external diameter of thimble 19 may be slightly greater than that of bolt head 18 so that when in its socket the side of the bolt head is held away from the walls of the socket.

The socket member consists of a bridge or thrust plug 7 having a central body portion 7a flanked by wings or ribs 138 equal in number to the legs 136. The lower end of body 7a is concave with a greater radius than the radius of the bolt head and the wings 138 project below the body and are internally beveled as at 139. The upper end of the body has an upwardly facing cup shaped recess or basin 140 with a wall 7b which preferably has an inwardly sloping feather edge 141 at the top rim. The external diameter of the wall 7b should be cylindrical or greatest at the upper end. A passage for circulation fluid 142 is formed between wall 7b and tube 5 and this passage at its upper end should be a shade narrower than the narrowest circulation passage between the inner and outer core barrels. The plug 7 may be retained in position in the outer case 5 by means of set screws 143 or other means.

The function of the cup like recess 140 is as follows. Most drilling crews aim to have their circulation fluid free from coarse chunks of grit and gravel but in spite of the greatest care a few large chips may creep into the fluid.

If these chips lodge between the inner and outer barrel they lock the barrels against relative rotation with the result that the core twists apart at frequent intervals forming short segments which are impossible to orient. By providing the narrow passage 142 any chips that can pass this narrow place are small enough to pass between the barrels without locking them together. To obviate the danger of chips accumulating to clog passage 142 the cup like recess 140 is provided into which they can drop. Circulation is more or less turbulent so that after remaining on the feather edge 141 a few seconds the chips dislodge and drop into cup 140 where they churn around if small or settle if large. The number of objectionable chips is never large but only one is sufficient to lock the barrels if it lodges between them. Consequently a small cup is sufficient to handle the few large chips.

The graduated plug 15 may be marked or graduated on its external surface by longitudinal graduations from 0 to 360 degrees, preferably in five or ten degree divisions. It is best to have the zero mark occur on the side corresponding to the direction in which the photographic strip 37 advances under the compass in order to simplify calculations.

The spring coupling 14 is more completely described in my co-pending application Serial Number 346,956 filed March 14, 1929. In the form disclosed in the present application the coupling 144 connects mandril 145 and graduated plug 15. The lower end of mandril 145 is loosely keyed by key 148 into coupling 146 so that it may have a sliding fit to telescope without rotation relative to coupling 146 when coil spring 147 is compressed. The extreme lower end of mandril 145 is slightly enlarged so that it resists the tendency of spring 147 to pull it out of coupling 146. It may be mentioned here that where it is necessary to economize length the coupling 144 can be omitted so that mandril 145 screws directly into the graduated plug 15 and the coupling 146 can be made integral with the upper member 152 of the check valve 12.

Check valve 12 consists of a cage member 152 provided with a relief port 149 and containing a ball check valve 13. The cage is screwed onto seat member 151 which may be provided with projecting knobs 153 of slightly greater external diameter than the internal diameter of coupling 4.

Tube 11 which connects seat member 151 and coupling 10 may be omitted in many cases. As previously stated the outer case 5 is of non-magnetic material. In order to withstand the strains of drilling special high strength bronze or other alloy must be used. Applicant has not yet been able to obtain lengths of this material greater than twelve feet in the sizes suitable for oilfield work and this length is not always sufficient to house the entire inner member. Therefore a coupling 4 is necessary and in order to furnish strength its internal diameter may be less than the remainder of the outer barrel. In such cases the section 11 of reduced diameter is necessary.

It may be mentioned here that as far as possible all parts of the inner organization within case 5 should also be of non-magnetic material.

The core receiving tube 9 may be of standard or heavy weight steel pipe and receives the core. It should be fairly smooth internally.

Figure 27:
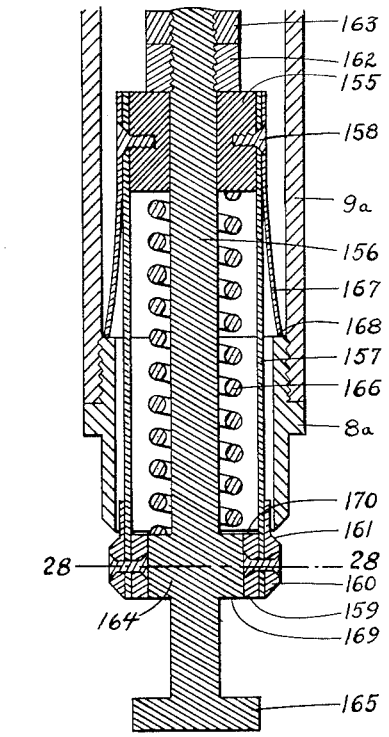
Figure 27 is a longitudinal section through the mudguard showing it in place in a nonfluted shoe of an inner core barrel.

The shoe or nose 8 which is attached to the lower end of the core receiving barrel 9 may be of several forms. The most satisfactory form has been one with a fluted interior surface having an internal diameter slightly smaller than tube 9 and a cutting edge beveled 45 degrees from the inner wall as shown in Figure 13 and in my co-pending application, Serial Number 346,957 filed March 14, 1929. An index mark 154 may be made at some point on the external surface, for example a center punch, cold chisel, or file cut, and this mark is used with reference to the graduated plug. In some formations a smooth bore nose may be preferable to a fluted nose. (Fig. 27). The core is retained in these types of nose by the friction of the core against the interior wall of the nose but if necessary additional core gripping means may be provided. A slight internal taper with the bore enlarging upwardly is helpful in some formations.

Figure 28:
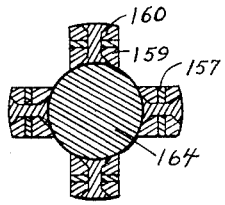
Figure 28 is a cross section taken on line 28—28.
Figure 25:
Figure 25 is a side view of thimble 19.

When the core drill is lowered into a well it often happens that chunks of debris or cavings are scooped into the inner barrel on its downward trip and choke the barrel to prevent entry of the core. To avoid this condition it is advisable to use a temporary plug or mud guard in the entrance of the inner barrel. Numerous forms have been tried by applicant with varying degrees of merit. One form is shown in my co-pending application Serial Number 346,955 filed March 14, 1929 and another form is shown in longitudinal section in Figures 27 and 28.

The mud guard consists of a disc 155 through which a mandril 156 is loosely fitted to slide freely. Spring arms 157 are attached to the disc as by screws 158 and at the lower end of each arm plates 159 and 160 are securely attached by rivets, screws or other means. The upper face of each external plate 160 is beveled as at 161. The mandril 156 may be threaded at the upper end to receive the nut 162 and jam nut 163 or it may have a washer and cotter. The mandril 156 is also provided with an enlargement 164 positioned opposite the internal plates 159 when nut 162 is against disc 155. Below the enlargement the mandril is again reduced in diameter for a length greater than the length of plate 159. The extreme lower end of the mandril may be enlarged to form a head 165. A coiled compression spring 166 is disposed around the mandril between disc 155 and enlargement 164 to urge them apart so that the normal position is with enlargement 164 opposite plates 159 and nut 162 against disc 155. A second set of spring arms 167 may be attached by screws 158 to disc 155 so that they urge outwardly. Where a core gripper with upwardly pointing springs is used in the inner barrel a shoulder can be substituted for springs 167.

The assembled mud guard is positioned in shoe 8a by pushing it in nut end first. Size should be proportioned to fit the shoe it is used with. The mud guard is prevented from falling out of the barrel by the spring barbs 167 and it is also prevented from ascending the barrel by shoulders 161 which are held out beyond the shoe by enlargement 164. During lowering of the core drill into the well with the mud guard in the position described all large chunks of debris are excluded from the barrel by the mud guard but liquid and small chips can enter through the spaces between arms 167 to relieve pressures. When the core drill reaches the bottom of the well the head 165 contacts the bottom and is forced into the core drill. Shoulder 161 prevents the entire mud guard moving upwardly by engaging the cutting edge of the nose so that the enlargement 164 compresses the spring 166 and slides relative to plate 159 until the lower end 169 passes the upper end 170 of the plate. When this occurs the spring arms 157 are free to contract and plate 160 is drawn inwardly to clear the edge of shoe 8a so that the mud guard can enter the core barrel. During coring the mud guard leads the core into the barrel resting on the top of the core. When debris is excluded from the inner barrel the core received therein is usually very free and easily removed from the barrel.

The assembly of the orientation core drill is as follows. The recording instrument is removed from the tube 16 and plug 15. Switch 114 is swung aside and tube 150, 118 removed. One end of a long strip of photographic paper or film 37 is attached to the tail reel 29 as by a gummed sticker and the strip is spooled on the reel. The advance end of the strip is passed over rollers 35, 36 and attached by a gummed sticker to lead reel 30 and spooled on about one turn. Ordinary "Velox" or "Noko" papers have been found satisfactory and the sensitive side should obviously face tube 118. The compass, pendulum, dry cells and light are inspected and if in order the tube 150, 118 is replaced in the frame and switch 114 closed on contact tip 116 to retain the tube in place. Switch 114 should be stiff enough to hold the tube unit in place. If the mechanism has been tied or locked to prevent excessive idle running, as by temporary screw 179, Figure 14b, it is released and both power springs are wound. A record is made of the exact hour minute and second by the observer's watch at which the light flashes and the reel moves: particular note is made of the time of first exposure: also the interval between flashes as regulated by screw 103 is noted. The frame is inserted in tube 16 leaving the lower end project so that graduated plug 15 can be attached by pin 22. The plug is then screwed tightly into case 16 enclosing the instrument. The inner organization is next assembled from the instrument case to nose 8 and a notation made of the degree graduation on plug 15 that mark 154 is in alignment with.

It may be mentioned here that the photographic strip should be protected from light at all times until developed and that it is best to instal and remove the instrument from the case 16 in a dark room where the strip can also be developed.

Two optional methods of assembling the inner organization in the outer organization are as follows.

First method. The outer organization may be completely assembled except for the cutter head 1. The assembled inner organization is slid into the outer from the lower end until bolt-head 18 seats in the socket of plug 7. When this method is followed the external diameter of knobs 153 and parts of the inner organization above should be less than the internal diameter of coupling 4 and inner barrel 3. With the bolt head seated set screws 171 are tightened onto their shoulders 172. When tight the inner ends of the screws 171 should pass between the legs of thimble 19 but not reach the shank of bolt 18. Emergency screws 173 can be placed in coupling 4 to prevent loss of the inner organization should the upper screws fail. Cutter head 1 is then attached and tightened and the core drill is ready to go into the well. When assembled in this manner it will be seen that the weight of the inner member is suspended by the head of bolt 18 resting on thimble 19 which in turn is supported on set screws 171. When the inner barrel is supported on the bottom of the hole during coring the direction of the thrust is reversed so that the head of bolt 18 bears against the concave seat of plug 7. In either case it will be seen that there is provision for free relative rotation between inner and outer organizations.

Second method. The cutter head 1, lower sub 2, outer barrel 3 and coupling 4 are assembled and hung in the rotary table. The inner organization is picked up bodily and lowered into the assembly just mentioned until shoe 8 rests on cutter head 1 or knobs 153 rest on coupling 4. In this method knobs 153 should be of greater external diameter than the internal diameter of coupling 4. The outer case 5 is then lowered over the projecting instrument case and screwed into coupling 4 making the assembly as shown in Figures 1 and 2. If desirable the core drill can be raised so that inner organization can be pushed up and set screws 171 tightened between legs 136 of thimble 19. The legs 136 can be turned to proper position from the position shown in Figure 1 by working a rod or nail thru the hole for screw 171. Screws 173 may also be used. In many formations it is not necessary to use the set screws if knobs 153 are used.

It may be mentioned here that numerous variations or adjustments can be made in the position of the shoe 8 relative to cutter head 1 and the travel of spring 47. One very good relation has been to have the inner shoe project about half an inch ahead of the outer cutter head in normal position and allow is to retract to half an inch behind (or inside) when the spring is fully compressed.

When assembled the core drill is lowered into the well on the end of rotary drill pipe. It may be mentioned here that a notation should be made each time the instrument makes an observation to show the position and movement of the core drill: whether flat, vertical, quiet or moving or in the well. While in the well if a survey of the course of the hole is desired the core drill should remain quiet about one minute each time an observation is made by the instrument.

When the core drill has been lowered to within a few feet of the bottom of the well the swivel and grief stem are connected and the pumps started. At this stage it is advisable to rotate the drill pipe slowly (5 R.P.M.) for several minutes to equalize the circulation fluid and at the same time make several photographic exposures with the core drill rotating. In these exposures the compass needle points north while the photographic strip beneath it rotates with the drill so that when developed the picture is a blur.

When the circulation fluid has been equalized coring is commenced and the desired amount of core taken. When the core is nearly completed the rotative speed and downward feed of the core drill are slowed until a few seconds before the photographic observation is due. In some combinations of equipment and formation a legible photograph can be made with the circulation and rotation uninterrupted. In other cases it may be best to stop the circulation pumps and core drill rotation about half a minute before the light 122 is expected to flash and allow the instrument to remain perfectly quiet until after the flash has been completed, the total period of quiet being between one and two minutes according to the accuracy of the individual clock on the instrument. When the core is of slow digging formation several observations of the orientation can be made during coring as a check on the slippage or creep of the inner barrel around the core. The last observation is the one to be taken for the orientation of the core. After the orientation records have been made the core drill may be raised off bottom of the well and rotated for several minutes to take a second series of blur photographs. The reason for taking these blur photographs before and after coring is to be able to check the selection of photographs corresponding to the period of coring against the selection by the time of the observer's watch.

The drill pipe end and core drill is pulled out of the well during which a check survey can be made by allowing a period of quiet each time an observation is expected. The core drill is dismantled and the inner organization removed. The alignment of mark 154 relative to graduated plug 15 is checked and the inner core barrel disconnected.

The core is removed from the inner barrel taking great care not to twist it relative to the barrel during removal and a longitudinal mark is scratched or painted on the core in alignment with mark 154. This is the key mark.

The recording instrument is removed from case 16 and the exact timing of the record checked against the observer's watch. The photographic strip 37 is removed from the reels and developed in the conventional photographic chemical baths.

Figure 23:
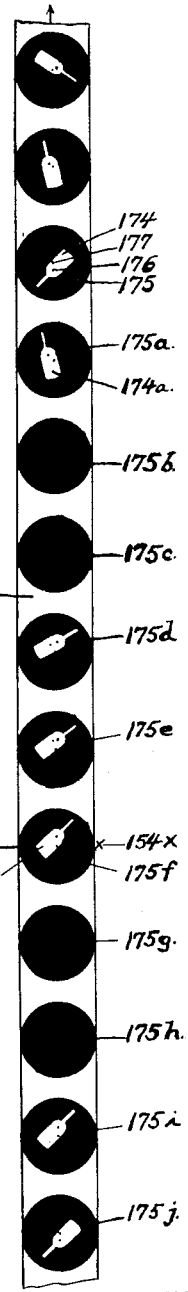
Figure 23 shows a typical developed record strip.
Figure 24:
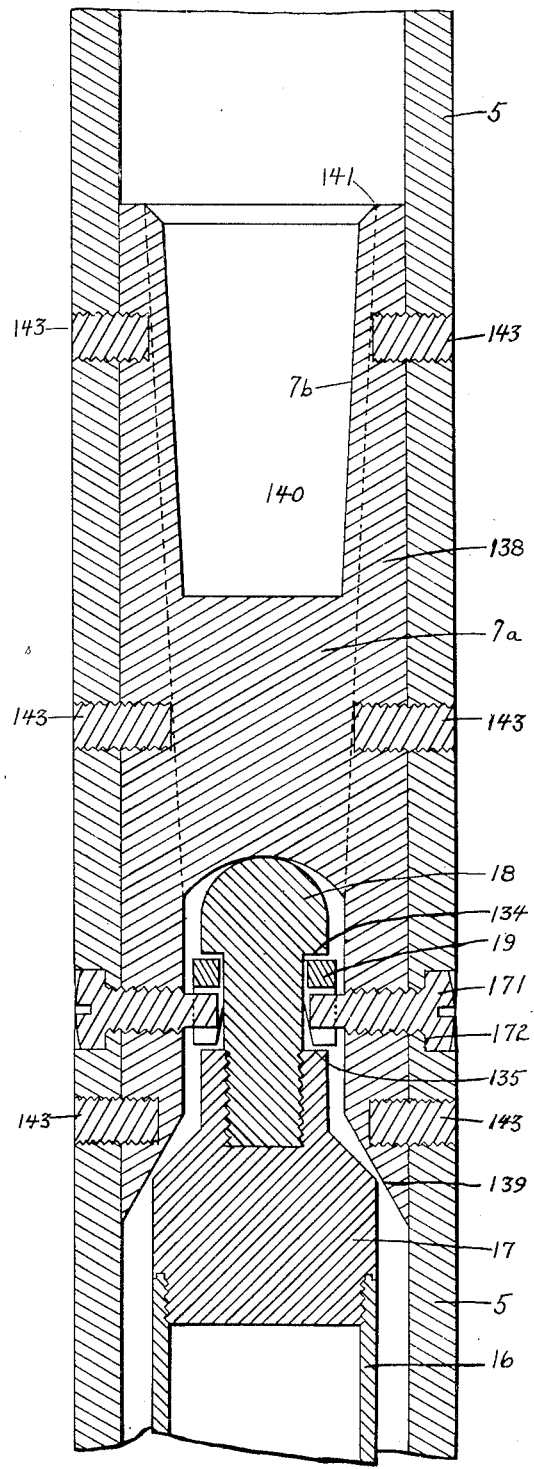
Figure 24 is a longitudinal section showing the construction of the thrust bearing.

A typical developed photographic record strip is shown on Figure 23. The bottle shaped white figure 174 is the shadow of the magnetic compass card 131, the small end being the north end. Various designs can be used for this card. It will be noted that the shadow developes white on the black circle 175 resulting from exposure to the flashlight 122. It will also be observed that the center 176 of the compass shadow does not coincide with the center 177 of circle 175. This is because the well hole has deviated from vertical and the compass which is suspended from pivot 127 hangs eccentric to tube 118 and the direction of rays from lamp 122. If the length of the pendulum from pivot 127 to the center of compass card 131 were one quarter of an inch and the eccentricity of point 176 from the center 177 were 0.06 inch then the deviation from vertical is 0.24 inch per inch, 24 feet per hundred, or 13 degrees. The direction of deviation is indicated by its relation to the north pointing shadow, in this case is southeast. Compass photo 174 indicates a deviation from vertical of 13 degrees southeast.

Similarly compass photo 174a indicates a deviation of the well hole from vertical of 15 degrees southeast. The depth corresponding to these observations can be determined by reference to the length of pipe installed in the well at the instant they were taken as identified by the observer's watch.

The all black circles 175b and 175c should coincide with the observer's watch for the observations when the drill pipe was rotating to equalize the circulation fluid. The compass photos 174d, 174e and 174f should coincide with the observer's watch for the observations taken during coring.

Compass photograph 174f is the one taken on completion of coring and the one from which the orientation of the core is computed. As previously stated the instrument frame is attached to the graduated plug 15 by pin 22 in a known position which is preferably such that the leading end of the photographic strip 37 is toward the zero graduation. If the position of the mark 154 were recorded as in alignment with the 90 degree graduation of the plug and the direction of dip in the core were opposite to the key mark on the core as determined by mark 154, then the cross (x on Figure 23) 154x indicates the alignment of mark 154 relative to the photo and the arrow 178 indicates the direction of stratigraphic dip relative to the photograph 175f. Since the compass shadow 174f indicates the magnetic north for this photo, then the apparent direction of stratigraphic dip is determined as south 45 degrees west. This photograph indicates a deviation of the well from vertical amounting to 15 degrees south east which necessitates a correction to determine the exact direction of stratigraphic dip. The correction can be calculated by descriptive geometry or trigonometry and will not be described here.

The photograph 175f establishes the orientation of the core.

The all black circles 175g and 175h should coincide with the observer's watch for the observations when the drill pipe was rotating after completion of the core. Compass photograph 174i indicates the first observation after starting to pull out of the well.

When it is not desirable to use screws 171 and 173 the holes for receiving them can be omitted from the construction or short screws used to plug the holes.

In Figure 14b the fan 61 is shown locked by lock screw 179 but in Figure 17 it is shown locked by hook 68 in a slightly different position.

It will be understood that various changes in detail of construction may be made without departing from the spirit or scope of the invention as defined by the appended claims.

I claim as my invention:

1. An apparatus for orienting cores comprising an inner core receiving barrel, an outer barrel disposed about and rotatable relative to said inner barrel, a core cutter on the lower end of said outer barrel, and a recording instrument carried by said inner barrel including a direction indicator, an inclinometer, a timing mechanism, a photographic record strip, a motor releasable at regular periodic intervals by said timing mechanism for advancing said record strip a substantially uniform distance with each release, photoelectrical means controlled by said timing mechanism for recording a position of said indicator and said inclinometer on said strip between advances of said strip, and a housing for said instrument provided with markings on the exterior surface thereof in known relation to the position of said strip.

2. An apparatus for orienting cores comprising an inner core receiving barrel, an outer barrel disposed about and rotatable relative to said inner barrel, a core cutter on the lower end of said outer barrel, and a housing carried by said inner barrel containing a direction indicator, an inclinometer, a timing mechanism controlled by a balance wheel and escapement, an intermittent recording mechanism adapted to record positions of said direction indicator and said inclinometer relative to said housing, and a contact and release operated by said timing mechanism controlling said recording mechanism to cause records to be made at regular periodic intervals, said housing and said inner barrel being provided with external marks in known position relation to each other.

3. An apparatus for orienting cores comprising an inner core receiving barrel, an outer barrel disposed about and rotatable relative to said inner barrel, a core cutter on the lower end of said outer barrel, and a housing carried by said inner barrel containing a direction indicator, an inclinometer, a timing mechanism controlled by a balance wheel and escapement, an intermittent recording mechanism adapted to record positions of said direction indicator and said inclinometer relative to said housing, a contact and release operated by said timing mechanism controlling said recording mechanism to cause records to be made at regular periodic intervals, and an adjuster for selecting different time intervals between records, said housing and said inner barrel being provided with external marks in known position relation to each other.

4. An apparatus for orienting cores comprising a core drill including a core receiving barrel and a recorder, said recorder having means for recording the inclination of and the direction faced by said core barrel at regular periodic intervals, said means including an adjuster for changing the length of said intervals.

5. A direction and inclination recorder comprising a tube, a flashable electric lamp in one end of said tube, electric cells connected with said lamp, a magnetic compass needle and pendulum within said tube adjacent the opposite end, a sensitive photographic strip mounted on reels and passing in front of the end of said tube with the sensitive side facing the interior of said tube, a spring driven motor adapted to turn said reels, a spring driven timing mechanism including a balance wheel and escapement, an electric switch operated by said timing mechanism to close the electric circuit lighting said lamp at regular periodic intervals, a control operated by said timing mechanism including a lock releasable to start said motor and a cam holding said lock in released position until said strip has advanced a distance approximately equal to the diameter of said tube, and a frame supporting the aforementioned elements, said motor being operated to advance said strip when said lamp is dark.

6. A direction and inclination recorder comprising a tube, a flash light at one end of said tube, a bridge spider within said tube adjacent the opposite end, a loop suspended from said bridge spider and free to swing as a pendulum, a staff within said loop supported on the lower side thereof and having its longitudinal axis in alignment with the center of gravity and the point of suspension of said loop, a magnetic compass needle pivoted on the end of said staff, and a sensitive photographic sheet at the end of said tube facing inwardly.

7. A combined direction and inclination indicator comprising a pendulum suspended from a pivot, said pendulum having the form of a symmetrical loop, a staff projecting upwardly from the lower side of said loop having its axis in alignment with said pivot and the center of gravity of said pendulum, and a magnetic compass needle pivoted on the end of said staff.

8. An apparatus for orienting cores comprising a core drill including a core receiving barrel and a recording instrument mounted on said barrel, said instrument including an electric flashlight, reels adapted to carry a sensitive photographic record strip driven by a spur gear system from a main spring, a magnetic compass needle pivoted between said flashlight and the path of said strip, a governing spur gear system driven by said main spring and having a notched disc wheel on one shaft and a fan plate on another shaft, a timing mechanism controlled by a balance wheel and escapement and having a spoked wheel, an electric brush contacting said wheel to flash said flashlight, and a shaft having arms engaging said disc wheel, said fan plate and said spoked wheel.

9. A core drill for orienting cores comprising an inner organization including a core receiving tube and a recording instrument and an outer barrel rotatably mounted about said inner organization, said organization having supporting means thereon below said instrument and above said core receiving tube for engaging said outer barrel.

10. A method of orienting cores with a core drill having a photographic recording instrument on the inner barrel which consists of lowering the core drill on drill pipe into a well to a level above the bottom of the well, rotating said pipe and drill while hanging to make illegible photographic records, lowering said drill thereafter to the bottom of the well, drilling a core with said drill and making photographic records during coring, causing said drill to remain quiet after completion of said core and before raising said drill from the bottom of the well to make a clear photographic orientation record, raising said drill off bottom and rotating while hanging to make a second set of illegible photographic records, removing said drill from said well, developing the photographic records, and identifying the clear orientation record by its position between illegible records.

11. A method of orienting cores with a core drill having a photographic recording instrument on the inner barrel which consists of lowering the core drill on drill pipe into a well to a level above the bottom of the well, rotating said pipe and drill while hanging to make illegible photographic records, lowering said drill thereafter to the bottom of the well, drilling a core with said drill and making photographic records during coring, causing said drill to remain quiet after completion of said core and before raising said drill from the bottom of the well to make a clear photographic orientation record, raising said drill off bottom and rotating while hanging to make a second set of illegible photographic records, removing said drill from said well, developing the photographic records, identifying the clear orientation record by its position between illegible records, and comparing the records during coring with the clear orientation record to determine whether the core had twisted from its position before the clear record was made.

In testimony whereof I have signed my name to this specification.

GEORGE A. MACREADY.